(12) United States Patent
Peterson et al.

(10) Patent No.: US 12,299,347 B2
(45) Date of Patent: May 13, 2025

(54) DEVICE DISTURBANCE REDUCTION

(71) Applicant: Lenovo (United States) Inc., Morrisville, NC (US)

(72) Inventors: Nathan Peterson, Oxford, NC (US); Gary D Cudak, Wake Forest, NC (US); John M Petersen, Wake Forest, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 236 days.

(21) Appl. No.: 17/699,381

(22) Filed: Mar. 21, 2022

(65) Prior Publication Data

US 2023/0297322 A1 Sep. 21, 2023

(51) Int. Cl.
*H04M 3/00* (2024.01)
*G01S 11/14* (2006.01)
*G06F 3/16* (2006.01)
*H04L 12/66* (2006.01)
*H04M 5/00* (2006.01)
*H04R 3/00* (2006.01)

(52) U.S. Cl.
CPC ............ *G06F 3/165* (2013.01); *G01S 11/14* (2013.01); *H04R 3/00* (2013.01); *H04R 2430/01* (2013.01)

(58) Field of Classification Search
CPC ............ H04R 2430/01; H04R 2420/07; H04R 2227/005; H04R 3/12; H04R 5/033; H04R 2410/05; H04R 1/1083; G06F 3/165; G06F 3/167; H03G 3/342; H03G 3/32; H04M 1/72442; H04M 1/72448; H04M 1/72454; H04M 1/72469; H04M 1/6083; H04M 1/6091; H04W 4/02; H04W 76/10; H04W 4/16; H04W 4/40
See application file for complete search history.

(56) References Cited

U.S. PATENT DOCUMENTS

| | | | |
|---|---|---|---|
| 10,048,930 B1* | 8/2018 | Vega | H04R 27/00 |
| 10,959,022 B1* | 3/2021 | Baumbach | H04R 5/04 |
| 10,999,419 B1* | 5/2021 | Willis | G06F 16/68 |
| 11,080,011 B1* | 8/2021 | Denis | H04W 76/10 |
| 2009/0187967 A1* | 7/2009 | Rostaing | H04M 1/72403 726/1 |
| 2009/0326928 A1* | 12/2009 | Omiya | G06F 3/165 704/E19.001 |
| 2015/0079952 A1* | 3/2015 | Tsukada | H04W 4/16 455/414.1 |
| 2016/0247364 A1* | 8/2016 | Herman | G08B 21/182 |
| 2018/0103452 A1* | 4/2018 | Nguyen | H04N 21/4532 |
| 2018/0167908 A1* | 6/2018 | Kotreka | H04W 4/70 |
| 2019/0281387 A1* | 9/2019 | Woo | H04R 5/04 |
| 2022/0279307 A1* | 9/2022 | Preiss | G10L 21/0216 |

* cited by examiner

*Primary Examiner* — Kharye Pope
(74) *Attorney, Agent, or Firm* — FERENCE & ASSOCIATES LLC

(57) ABSTRACT

One embodiment provides a method, the method including: identifying, using a disturbance minimization system, a device as a primary device; identifying, using the disturbance minimization system, a context of the primary device; determining, using the disturbance minimization system and based upon the context of the primary device, that sound disturbances need reduced in an audible environment of the primary device; and reducing, using the disturbance minimization system and responsive to determining the sound disturbances need reduced, at least one sound disturbance produced by at least one device other than the primary device.

18 Claims, 3 Drawing Sheets

DEVICE DISTURBANCE REDUCTION

BACKGROUND

With the increase of people working from home, within entities that have removed dedicated office spaces, or other noisy environments, background noises and sights during meetings, phone calls, and other audible and/or visual communications have become more common. Other people may be audible or visible in the background of a conversation. Additionally, other devices may be audible or visible in the background of a conversation, for example, television sets, tablets, smart watches, other communication devices, and the like. Sometimes these disturbances may provide for very entertaining situations. However, these disturbances are frequently interruptive to participants within the communication connection.

BRIEF SUMMARY

In summary, one aspect provides a method, the method including: identifying, using a disturbance minimization system, a device as a primary device; identifying, using the disturbance minimization system, a context of the primary device; determining, using the disturbance minimization system and based upon the context of the primary device, that sound disturbances need reduced in an audible environment of the primary device; and reducing, using the disturbance minimization system and responsive to determining the sound disturbances need reduced, at least one sound disturbance produced by at least one device other than the primary device.

Another aspect provides an information handling device, the information handling device including: a processor; a memory device that stores instructions that, when executed by the processor, causes the information handling device to: identify, using a disturbance minimization system, a device as a primary device; identify, using the disturbance minimization system, a context of the primary device; determine, using the disturbance minimization system and based upon the context of the primary device, that sound disturbances need reduced in an audible environment of the primary device; and reduce, using the disturbance minimization system and responsive to determining the sound disturbances need reduced, at least one sound disturbance produced by at least one device other than the primary device.

A further aspect provides a product, the product including: a computer-readable storage device that stores executable code that, when executed by a processor, causes the product to: identify, using a disturbance minimization system, a device as a primary device; identify, using the disturbance minimization system, a context of the primary device; determine, using the disturbance minimization system and based upon the context of the primary device, that sound disturbances need reduced in an audible environment of the primary device; and reduce, using the disturbance minimization system and responsive to determining the sound disturbances need reduced, at least one sound disturbance produced by at least one device other than the primary device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
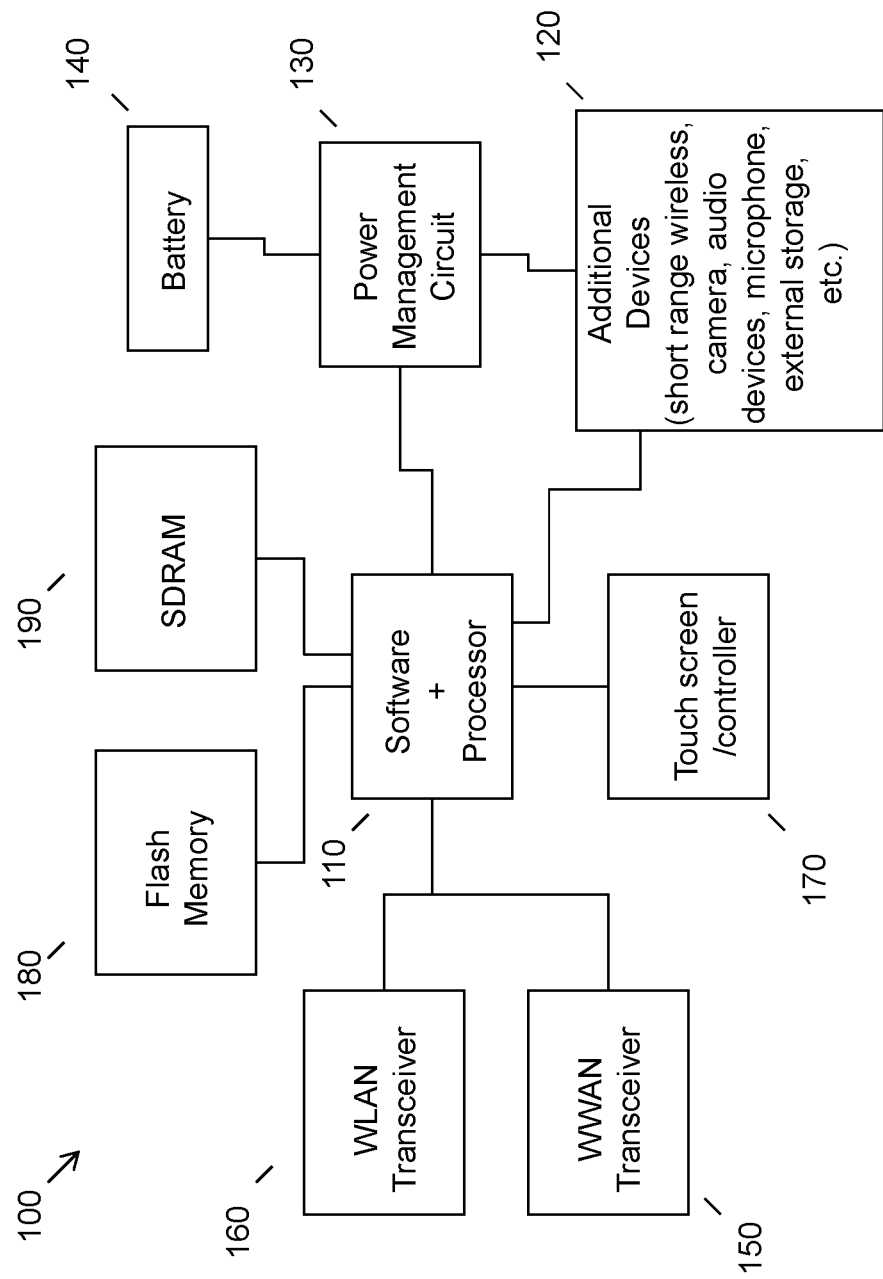
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Generally, users are becoming more used to noise and even visual disturbances in the background of communication connections, for example, kids or other people coming into the background on an audible or video call, other devices playing in the background, or the like. However, while users are becoming used to these disturbances, this does not mean that the users are particularly happy about the disturbances. Additionally, even the smallest disturbance can derail a conversation, interrupt or distract the person talking or presenting, make it harder for participants to hear the person speaking, or even make some participants upset over the disturbance.

While there are some solutions that work to decrease, minimize, or even eliminate visual disturbances, for example, the ability to blur or change a background, there are not really solutions that work to decrease, minimize, or eliminate audio disturbances. Instead, the user who is participating in a call, meeting, or other audible communication with another participant, generally has to try to minimize the audible disturbances themselves. This means trying to find a quiet place to conduct the calls or other audible communications. However, many people do not have the luxury of a dedicated quiet space or room. Additionally, even if a user does have a dedicated quiet space or room, this still does not ensure the reduction or elimination of audible disturbances because other people can still come into the dedicated quiet space or room.

Accordingly, the described system and method provides a technique for reducing sound disturbances around a primary device caused by other devices responsive to determining that a context of the primary device indicates that sound disturbances need to be reduced in the audible environment of the primary device. The disturbance minimization system identifies a device as a primary device. The device may be identified as a primary device based upon the purpose of the device, for example, if the device belongs to a user identified as a primary user, if the device is used for work-related or other important communications, and the like. The system may also identify a context of the primary device. The context identifies how the primary device is currently being used, which provides an indication of whether sound disturbances need to be reduced. For example, the identified context may be a participant on a work-related call or conference, a presenter on a call or conference, receiver of a call from an important person or contact, and the like.

Based upon the context of the device, the system may determine that sound disturbances need to be reduced in an audible environment of the primary device. In other words, the system determines whether there are other devices within audible proximity to the primary device. The system may determine whether devices are within audible proximity to the primary device using one or more sensors, for example, image capture sensors, microphones or other audio capture devices, distance or proximity sensors, short-range communication sensors, and the like. If the context indicates that sound disturbances need to be reduced, the system reduces sounds disturbances caused by devices around the primary device. Reducing the sound disturbances may include providing instructions to the device to reduce or eliminate any sound being output by the device. Additionally, the system may reduce or eliminate any sound that may be produced by the device while it is within audible proximity to the primary device.

Therefore, a system provides a technical improvement over traditional methods for improving communication quality. Unlike conventional techniques which focus on minimizing visual disturbances, the described system and technique focuses on minimizing audible disturbances from other devices that are within an audible proximity to the primary device. Since the system is able to detect a distance, proximity, or audibility of the device to the primary device, the system is able to take actions at the device to reduce the sound disturbance caused by the device, for example, by reducing the sound output by the device.

Additionally, since the type of sound reducing action taken is based upon a context of the primary device, other devices do not have to be automatically silenced just because they are located in proximity to the primary device. Rather, the system provides a technique the dynamically modifies the sound disturbances, or possible sound disturbances, caused by other devices based upon the context of the primary device and a position of the device with respect to the primary device. Additionally, the system is able to reset the devices to an original or previous sound level as the device moves away from the primary device or when the context of the primary device changes. Thus, the described system provides a technique for reducing audible disturbances caused by other devices when appropriate around a primary device, thereby reducing frustration and interruptions caused by audible sound disturbances on communication connections.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
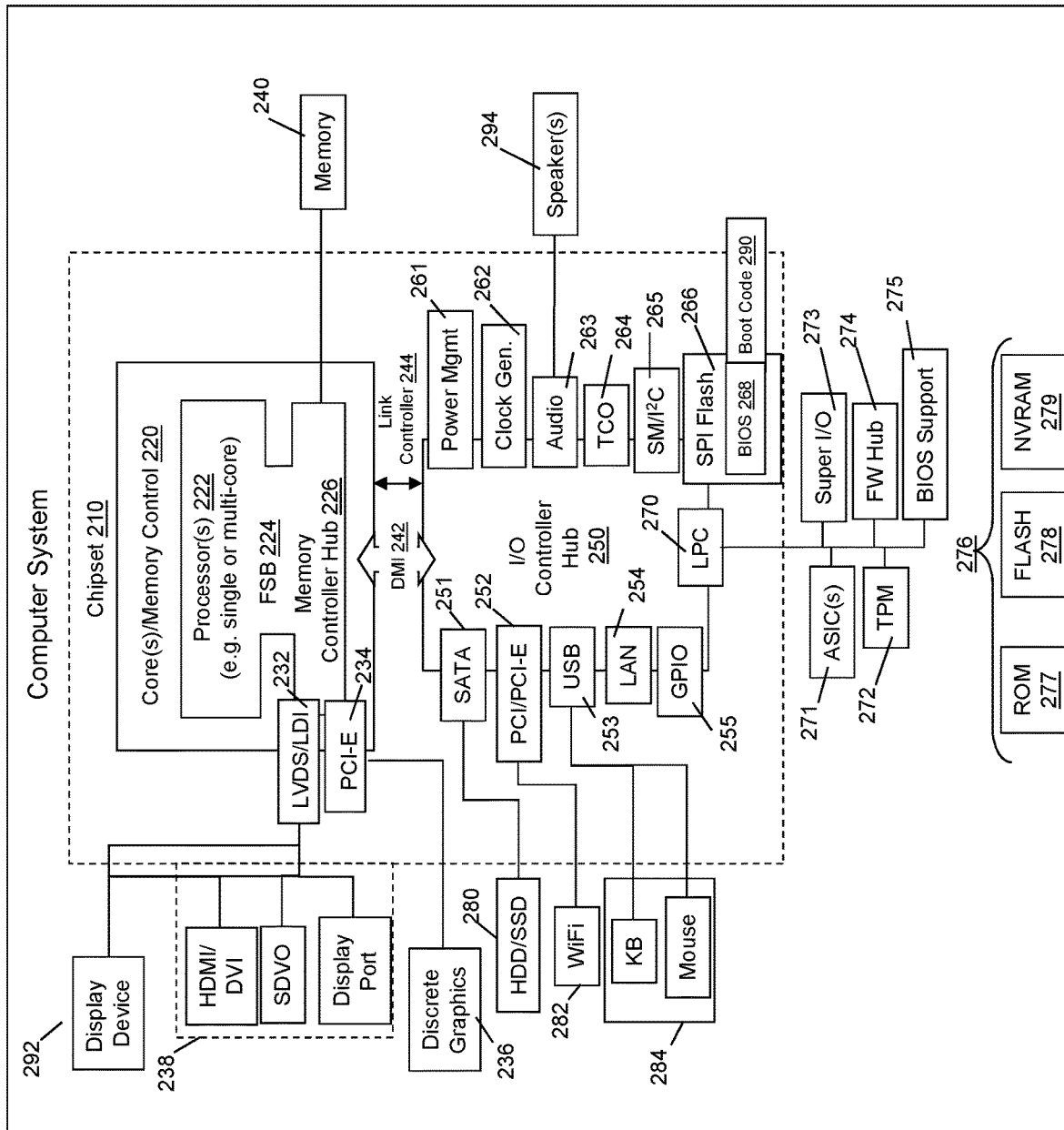
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that reduce sound disturbances in audible environments of primary devices based upon a context of the primary device. For example, the circuitry outlined in FIG. 1 may be implemented in a tablet or smart phone embodiment, whereas the circuitry outlined in FIG. 2 may be implemented in a personal computer embodiment.

Figure 3:
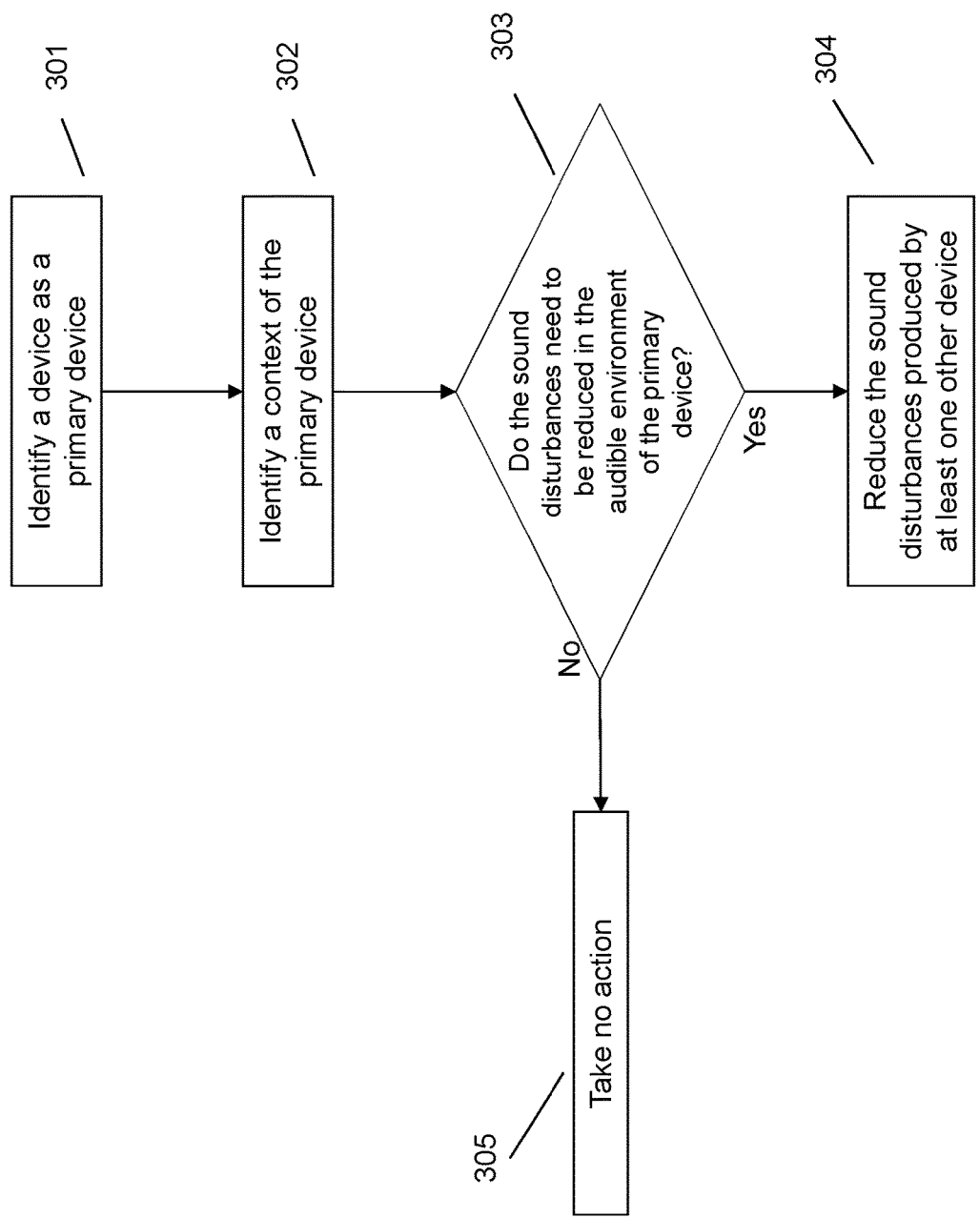
FIG. 3 illustrates an example method for reducing sound disturbances around a primary device caused by other devices responsive to determining that a context of the primary device indicates that sound disturbances need to be reduced in the audible environment of the primary device.

FIG. 3 illustrates an example method for reducing sound disturbances around a primary device caused by other devices responsive to determining that a context of the primary device indicates that sound disturbances need to be reduced in the audible environment of the primary device. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to reduce sound disturbances at a primary device. Additionally, the disturbance minimization system includes modules and features that are unique to the described system.

At 301, the disturbance minimization system identifies a device within an environment as a primary device. The environment may be a residence, office space, meeting space, or the like. Within the environment may be other devices, for example, television sets, other communication devices controlled by other users, tablets, smart watches, and the like. From the devices within the environment, the disturbance minimization system may identify one or more primary devices. A primary device may be identified for a particular space within an environment. For example, within one room in the environment, one device may be the primary device, but in another room a different device is the primary device. Thus, identification of the primary device may include identifying the location of one or more devices within the environment and then identifying which devices have been indicated as primary for that location.

Another technique for identifying a primary device may be based upon the user of the device. Some users may be identified as primary users. For example, an adult in the environment may be identified as a primary user rather than a child. As another example, a person associated with an activity identified as a primary activity may be identified as a primary user. For example, children performing remote school learning and people performing remote working may be identified as primary users rather than those people who are performing personal activities (e.g., relaxing watching television, playing games on a tablet, etc.) on devices. More than one user and, therefore, device may be identified as a primary user and primary device. In this case, the users/devices may be ranked, other user/device attributes may be taken into account (e.g., location within the environment, type of device, a number of devices surrounding the device, etc.), user and/or priority settings within the disturbance minimization system, and the like.

Another technique for identifying a primary device is based upon the purpose of the device. Some devices are dedicated to a particular purpose, for example, a work device, a personal device, an emergency device, and the like. Devices with different purposes may be given higher priorities and, therefore, by identified as a primary device. Since some devices may be used for multiple purposes, another technique for identifying a primary device may be based upon the day and/or time of day the device is being used. For example, a device being used during a typical work day of a user may be given a higher priority than other devices or than the same device outside the typical work day.

A device that is prioritized over other devices may be identified as the primary device. The prioritization may be based upon the device purpose, user of a device, system settings, activity the device is being used for, and the like. It should be understood that other techniques for identifying a primary device are possible and contemplated. Additionally, the techniques described herein for identifying the primary device may be used in conjunction with other identified techniques. In other words, identifying a primary device may be performed using a combination of techniques.

At 302, the disturbance minimization system identifies a context of the primary device. The context of the device identifies a current use of the primary device. In other words, the context provides an indication of whether sounds from other devices would be disturbances to the user of the primary device, other participants within a communication connection (e.g., call, video call, meeting, conference, etc.) with the primary device, and/or the like. The example use case of a call will be used here throughout for ease of readability. However, this is not intended to limit the scope of this disclosure to a call, as any communication connection with audible components would benefit from the described system and method.

To identify the context of the primary device the system may identify whether the primary device is currently in use or active within a communication connection. The system may monitor the primary device, applications running or active on the device, components in use or active on the device, and/or a current activity of the primary user (i.e., the user using or associated with the primary device). The context of the primary device may also be identified based upon a location of the device within the environment. Different locations within the environment may be designated as priority locations, primary locations, or designated quiet locations, which would indicate that sound disturbances should be reduced. To identify the context, the disturbance minimization system may utilize one or more sensors and/or components of the primary device, within the environment, accessible by the system, and/or the like. The sensors may include image capture sensors, proximity sensors, microphones or other audio capture devices, speakers or other audio output devices, digital or personal assistant devices, accelerometers, gyroscopes, infrared sensors, and/or the like.

Monitoring the primary device, applications, components, and/or current activity of the primary user may provide an indication regarding whether the user is connected to a communication connection and whether the user is active within the communication connection. Additionally, the monitored information is useful for determining the type of communication connection and whether the communication connection type is of a type where sound disturbances need or should be reduced. For example, a communication connection with a family member may not require reduction of sound disturbances, but a work communication connection does require reduction of sound disturbances.

To determine the type of communication connection, the system may monitor the participants on the communication connection. The participants may then be matched to a list that indicates a relationship between the participant and the user. This list may be contained within the primary device, within an accessible data storage location, and/or the like. For example, the list may identify an identified group of a participant, notes corresponding to the participant in a telephone and/or email contact list, email signatures designating an associated company of a participant, company organization chart, and/or the like.

The application utilized for the communication connection may also provide an indication of a relationship of the participant to the primary user. For example, companies may have company-specific communication applications. Thus, a communication connection using that application would likely designate the participants as work colleagues. On the other hand, personal communication connections may utilize standard call or video call applications. Thus, the system can monitor the application used for the communication connection to identify the context of the primary device. For example, if a meeting application, a call application, a video call application, or other communication connection application is currently active on the primary device, this may indicate that the primary device is currently being used within a communication connection.

The system may also identify whether components that are associated with communication connections are active, for example, microphones for capturing a user speaking, speakers for outputting sound from other participants, image capture devices for transmitting video between call participants, and/or the like. One or more of these components being active may indicate that the primary device is currently being used within a communication connection. It should be noted that some of these components may become inactive while on a communication connection, for example, a microphone may be muted to reduce the amount of disturbance from the user when the user is not speaking. However, this would not indicate that the user is no longer within the communication connection. Thus, the system may utilize a combination of techniques to determine if the communication connection is active, for example, whether an application and/or components are active. Additionally, the system may employ a timer or other time keeping mechanism and may require that an application and/or component be inactive for a predetermined length of time before identifying that the user is no longer within an active communication connection.

The system may also identify a current activity of the primary user. Based upon the current activity of the primary user, the system can determine if the user is actively using the primary device and for what purpose the primary device is being used. For example, the system can determine if the user is using the primary device for a communication connection or instead using it for a different purpose. Not only does the current activity of a user assist in identifying a context of the primary device, but it also assists in determining how engaged the primary user is within the communication connection. Different engagement levels may designate that different sound reduction actions should be taken.

Based upon the context of the primary device, the disturbance minimization system determines if the sound disturbances need to be reduced in the audible environment of the primary device at 303. To determine if the sound disturbances need to be reduced, the system may identify if the context corresponds to contexts where the sound disturbances need to be reduced. To make this identification, the system may access a data store that identifies contexts and corresponding sound disturbance reduction actions. Thus, the identification may simply be a matching function where the system finds the context and then identifies the sound reduction action. The sound reduction action may be one of multiple actions, for example, completely eliminating the sound disturbance, reducing the sound disturbance to a predetermined level, taking no action for a sound disturbance, or the like.

The sound reduction actions may also be set for a particular primary device, particular location, particular user, and the like. Additionally, other devices may have different sound reduction actions based upon one or more attributes (e.g., user, application producing the sound, location of the device with respect to the primary device, incoming communication attributes, etc.). For example, a device used by a child may be subject to complete sound elimination, whereas a device used by an adult may be subject to a small reduction in the sound, even if all other factors are equal. As another example, a sound created by a communication application of another device may be subject to a smaller reduction in sound than a sound created by a game application. As another example, a device that has been subject to complete sound elimination and that receives a call identified as important, may be allowed to produce a sound for that call notification.

The contexts and corresponding actions may be default by the system, programmed or manually set by a user, or the like. The contexts and corresponding actions may also be updated over time. For example, a user may manually update the data. Another technique for updating the contexts and corresponding actions may be to utilize historical information as the disturbance minimization system is utilized. For example, the system may learn that a particular context no longer requires that all sounds be eliminated. The system may also employ one or more machine-learning models that are trained on contexts and corresponding sound reduction actions. As the machine-learning model makes predictions and takes actions, new information regarding contexts and sound reduction actions will be identified. This new information can be automatically ingested by the machine-learning model to make better predictions and a more accurate model for contexts and corresponding sound reduction actions.

Once the system determines if a context of the primary device corresponds to a context where sound disturbances need to be reduced or eliminated, the system may determine whether one or more devices producing a sound are actually within proximity to the primary device. In this case, proximity is not as related to distance as it is related to whether the sound could be heard at the primary device. Thus, the system determines if the device is within an audible environment of the primary device, meaning the sound could be heard at the primary device. One technique for making this determination is based upon a distance between the primary device and a sound-producing device. The system may identify that within a particular distance to the primary device, sounds produced by other devices will be disruptive to the primary device.

The distances may take into account whether there are barriers between the location of the device and the primary device. For example, a wall will reduce the ability of the primary device to hear the sound produced by a device. Thus, a device that is the same distance from the primary device as another device but that has a barrier between the device and primary device will be subject to less sound reduction than the device with no barrier at the same distance.

The system may monitor all sound producing devices within the environment of the primary device. On the other hand, instead of monitoring all devices within the environment, the system may simply monitor the primary device and determine if audible sounds are detectable. If a sound is detectable at the primary device, the system may then determine which device is producing the sound. Thus, to determine if a device is within an audible environment of the primary device, the system may identify an audibility of the sound disturbances at the primary device. In other words, the system may identify if the sound can be heard at the primary device (i.e., if the device is within an audible range of the primary device) and how loud the sound is at the primary device.

If the system determines the sound disturbances do not need reduced at 303, the system make take no action with respect to the sound-producing device at 305. This determination may be made if the context does not require sound reduction, the device is not within the audible environment of the primary device, one or more attributes of the device indicate that sound reduction actions should not be taken for that device, the system cannot make a determination regarding a particular device, and/or the like.

If, on the other hand, the system determines the sound disturbances do need to be reduced at 303, the system may reduce at least one sound disturbance produced by at least one device other than the primary device at 304. To reduce the at least one sound disturbance, the disturbance minimization system may send an instruction to the sound-producing device to reduce a volume output or volume setting of the device. This reduction in volume output instruction may apply to all sounds produced by the device, even if not currently being produced, or may apply only to those sounds that are currently being produced by the device. Additionally, or alternatively, the instruction may apply to a subset of sounds that are being produced and that could be produced by the device. For example, the instruction may apply to all applications that can produce sounds other than call applications. Thus, in this example, all other sounds would be reduced, but a call notification would be produced at a normal sound level.

The sound reduction may not be a complete elimination of a sound being output by a device. Rather, the sound reduction may only be a reduction of the sound being output by the device. The amount of sound reduction may be based upon the audibility of the sound at the primary device. In other words, the amount of sound reduction may be correlated to how loud the sound is at the primary device and may be reduced by an amount that makes the sound less or not at all audible at the primary device. Whether a sound is minimized to be no longer heard at the primary device or simply reduced to be less of a disturbance at the primary device may be based upon attributes of the device and information contained within the context/sound reduction action database. The amount of sound adjustment may occur at fine-grained adjustments (e.g., 1% at a time, 2% at a time, etc.) or less fine-grained adjustments (e.g., 5% at a time, 10% at a time, etc.).

The distance between the device and primary device may be broken into stages or ranges that designate how much the sound of the sound-producing device needs to be reduced by to minimize or eliminate the sound disturbance at the primary device. For example, a device within a first range that is further from the primary device would need the output sound reduced by a lower amount than a device within a second or third range that is closer to the primary device. Thus, the distances may be correlated to sound reduction amounts or thresholds. Similarly, the audibility of a device may also be broken into ranges where devices that are less audible have a sound reduction less than devices that are more audible.

Additionally, since many devices can be moved throughout an environment, the sound reduction action may be dynamic and occur in substantially real-time as the device moves through the environment. For example, as the device moves closer to the primary device the sound may continue to be reduced until it is completely eliminated, if applicable per the attributes and context/sound reduction action database, when the device is next to or within close proximity to the primary device. In other words, the sound can be dynamically reduced as the position of the device with respect to the primary device changes.

Similarly, as the device moves further from the primary device, with respect to audibility at the primary device, the system may increase the sound setting until the sound setting is reset to a previous sound output setting. The previous sound output setting is the sound output setting that the sound was set to before the system made any changes to the sound output setting. Resetting to the previous sound output setting may also be performed in stages or ranges. As the device reaches each of the new stages or ranges, the sound output setting may be increased. Once the device is out of audible range of the primary device, the sound output setting will be completely reset to the previous sound output setting. Thus, the resetting of the sound output setting may be performed by an amount correlated to an audibility of the device at the primary device, just as reducing the sound output was performed.

Additionally, the sound output setting may be reset if the context of the primary device changes. For example, if the primary device is no longer being used for a purpose that corresponds to a context that needs sound disturbances minimized, the sound output of the device may be reset back to the previous sound output setting. Additionally, if primary device changes contexts or becomes less active in a current context, the sound output setting may be adjusted. For example, if the primary device is being used in a conference and the user is actively engaged in the conference by providing output in the conference, the sound output setting may be eliminated for a device within close audible proximity to the device. If the user thereafter mutes the microphone and is no longer providing output in the conference, the sound output setting may be changed to reduced but not eliminated.

In this example since users may frequently switch between a muted and unmuted microphone, the system may employ a timer or other time-keeping mechanism to provide a buffer between a lower sound output setting and a higher output sound setting. For example, the system may require that the microphone is not active for at least five minutes before increasing the sound output setting to a reduced setting instead of an eliminated setting.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   identifying, using a disturbance minimization system, a device as a primary device;
   identifying, using the disturbance minimization system, a context of the primary device, wherein the context of the primary device comprises identifying the primary device is active and the primary device is present in a communication connection with a device of at least one participant;
   determining, using the disturbance minimization system and based upon the context of the primary device in an audible environment, sound disturbances needing reduced in the audible environment of the primary device, wherein the determining comprises identifying an audibility of the sound disturbances at the primary device, wherein the identifying the audibility of the sound disturbances comprises determining a communication connection-type indicating a relationship between a user of the primary device and the at least one participant; and dynamically reducing, using the disturbance minimization system and responsive to determining the sound disturbances needing reduced, at least one sound disturbance produced by at least one device other than the primary device present in the audible environment, wherein the reducing comprises identifying a range of the at least one device with respect to the primary device and comprises dynamically changing the at least one sound disturbance based upon the primary device being active and at least one of: a position of the at least one device with the respect to the primary device and the relationship between the user and the at least participant present on the communication connection, wherein the range is correlated to a sound reduction amount, and wherein the reducing comprises reducing the at least one sound disturbance produced by the at least one device by the sound reduction amount;

wherein the dynamically changing the at least one sound disturbance comprises resetting a sound output setting of the at least one device to a previous output setting, responsive to determining the at least one device is no longer within the audible environment of the primary device.

2. The method of claim 1, wherein the reducing comprises reducing the at least one sound disturbance by an amount correlated to the audibility of the sound disturbances.

3. The method of claim 1, wherein the identifying a context comprises identifying a current use of the primary device.

4. The method of claim 1, wherein the identifying a context comprises identifying a location of the primary device.

5. The method of claim 1, wherein the resetting the sound output comprises resetting the sound output setting by an amount correlated to an audibility of the at least one device to the primary device.

6. The method of claim 1, wherein the reducing comprises reducing a volume setting of at least one device that is not currently outputting a sound.

7. The method of claim 1, wherein the determining comprises utilizing one or more sensors to identify the position of the at least one device with respect to the primary device.

8. The method of claim 1, wherein the identifying a primary device comprises prioritizing a plurality of devices and the device of the plurality of devices having the highest priority is identified as the primary device;

wherein the identifying a context comprises identifying a current use of the primary device;

wherein the determining comprises determining other of the plurality of devices are within an audible range of the primary device; and wherein the reducing comprises decreasing a sound volume setting on the other of the plurality of devices via sending an instruction from the disturbance minimization system to the other of the plurality of devices.

9. An information handling device, the information handling device comprising:

a processor;

a memory device that stores instructions that, when executed by the processor, causes the information handling device to:

identify, using a disturbance minimization system, a device as a primary device;

identify, using the disturbance minimization system, a context of the primary device, wherein the context of the primary device comprises identifying the primary device is active and the primary device is present in a communication connection with a device of at least one participant;

determine, using the disturbance minimization system and based upon the context of the primary device in an audible environment, sound disturbances needing reduced in the audible environment of the primary device, wherein to determine comprises identifying an audibility of the sound disturbances at the primary device, wherein the identifying the audibility of the sound disturbances comprises determining a communication connection-type indicating a relationship between a user of the primary device and the at least one participant; and dynamically reduce, using the disturbance minimization system and responsive to determining the sound disturbances needing reduced, at least one sound disturbance produced by at least one device other than the primary device present in the audible environment, wherein to reduce comprises identifying a range of the at least one device with respect to the primary device and comprises dynamically changing the at least one sound disturbance based upon the primary device being active and at least one of: a position of the at least one device with the respect to the primary device and the relationship between the user and the at least participant present on the communication connection, wherein the range is correlated to a sound reduction amount, and wherein to reduce comprises reducing the at least one sound disturbance produced by the at least one device by the sound reduction amount;

wherein the dynamically changing the at least one sound disturbance comprises resetting a sound output setting of the at least one device to a previous output setting, responsive to determining the at least one device is no longer within the audible environment of the primary device.

10. The information handling device of claim 9, wherein to reduce comprises reducing the at least one sound disturbance by an amount correlated to the audibility of the sound disturbances.

11. The information handling device of claim 9, wherein the identifying a context comprises identifying a current use of the primary device.

12. The information handling device of claim 9, wherein the identifying a context comprises identifying a location of the primary device.

13. The information handling device of claim 9, wherein the resetting the sound output comprises resetting the sound output setting by an amount correlated to an audibility of the at least one device to the primary device.

14. The information handling device of claim 9, wherein the reducing comprises reducing a volume setting of at least one device that is not currently outputting a sound.

15. The information handling device of claim 9, wherein the determining comprises utilizing one or more sensors to identify a location of the at least one device with respect to the primary device.

16. A product, the product comprising:
a computer-readable storage device that stores executable code that, when executed by a processor, causes the product to:
identify, using a disturbance minimization system, a device as a primary device;
identify, using the disturbance minimization system, a context of the primary device, wherein the context of the primary device comprises identifying the primary device is active and the primary device is present in a communication connection with a device of at least one participant;
determine, using the disturbance minimization system and based upon the context of the primary device in an audible environment, sound disturbances needing reduced in the audible environment of the primary device, wherein to determine comprises identifying an audibility of the sound disturbances at the primary device, wherein the identifying the audibility of the sound disturbances comprises determining a communication connection-type indicating a relationship between a user of the primary device and the at least one participant; and
dynamically reduce, using the disturbance minimization system and responsive to determining the sound disturbances needing reduced, at least one sound disturbance produced by at least one device other than the primary device present in the audible environment, wherein to reduce comprises identifying a range of the at least one device with respect to the primary device and comprises dynamically changing the at least one sound disturbance based upon the primary device being active and at least one of: a position of the at least one device with the respect to the primary device and the relationship between the user and the at least participant present on the communication connection, wherein the range is correlated to a sound reduction amount, and wherein the reducing comprises reducing the at least one sound disturbance produced by the at least one device by the sound reduction amount;
wherein the dynamically changing the at least one sound disturbance comprises resetting a sound output setting of the at least one device to a previous output setting, responsive to determining the at least one device is no longer within the audible environment of the primary device.

17. The method of claim 1, wherein the identifying the context of the primary devices comprises identifying a location of the primary device within the audible environment;
wherein the location of the primary device within the audible environment is at least one of: a priority location, a primary location, and a designated quiet location.

18. The information handling device of claim 9, wherein the identifying the context of the primary devices comprises identifying a location of the primary device within the audible environment;
wherein the location of the primary device within the audible environment is at least one of: a priority location, a primary location, and a designated quiet location.

* * * * *